United States Patent
Miyazaki

(10) Patent No.: US 6,669,374 B2
(45) Date of Patent: Dec. 30, 2003

(54) WHEEL-SUPPORT ROLLING BEARING UNIT AND METHOD OF MANUFACTURING THE SAME

(75) Inventor: Hiroya Miyazaki, Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

(21) Appl. No.: 10/247,477

(22) Filed: Sep. 20, 2002

(65) Prior Publication Data

US 2003/0016894 A1 Jan. 23, 2003

Related U.S. Application Data

(62) Division of application No. 09/739,665, filed on Dec. 20, 2000, now Pat. No. 6,553,666.

(30) Foreign Application Priority Data

| Dec. 20, 1999 | (JP) | P. 11-360631 |
| Dec. 20, 1999 | (JP) | P. 11-360632 |
| Nov. 29, 2000 | (JP) | P.2000-362463 |
| Nov. 29, 2000 | (JP) | P.2000-362464 |

(51) Int. Cl.$^7$ .............................. F16C 13/00; F16C 43/00
(52) U.S. Cl. .................. 384/537; 384/544; 384/499; 301/105.1; 29/894.362; 29/898.062; 29/898.07
(58) Field of Search .................. 301/105.1; 384/544, 384/499; 29/894.36, 894.361, 894.362, 898.061, 898.062, 898.07, 898.09

(56) References Cited

U.S. PATENT DOCUMENTS

| 4,893,960 | A | | 1/1990 | Beier et al. |
| 5,226,738 | A | * | 7/1993 | Valette et al. |
| 5,509,198 | A | | 4/1996 | Takamizawa et al. |
| 5,596,798 | A | | 1/1997 | Hofmann et al. |
| 5,822,859 | A | | 10/1998 | Kessen et al. |
| 5,911,458 | A | | 6/1999 | Bywalez et al. |
| 6,105,251 | A | | 8/2000 | Payen |
| 6,112,411 | A | | 9/2000 | Rutter |
| 6,113,279 | A | | 9/2000 | Sawai et al. |
| 6,158,124 | A | * | 12/2000 | Austin |
| 6,217,220 | B1 | | 4/2001 | Ohkuma et al. |
| 6,227,624 | B1 | | 5/2001 | Wiacek et al. |
| 6,398,419 | B1 | | 6/2002 | Kashiwagi et al. |
| 2003/0002761 | A1 | * | 1/2003 | Hagiwara |

FOREIGN PATENT DOCUMENTS

| DE | 34 18 440 A1 | 11/1985 |
| EP | 736398 A2 | 10/1996 |
| JP | 11-129703 | 5/1999 |
| WO | WO 98/58762 | 12/1998 |

* cited by examiner

Primary Examiner—Gregory Vidovich
Assistant Examiner—Eric Compton
(74) Attorney, Agent, or Firm—Sughrue Mion, PLLC

(57) ABSTRACT

An inner ring 3 is fit to a stepped part 8 formed on the inner end of a hub 2*b*. A desired pre-load is applied to rolling elements 5 in a state that an outer end face 28 of the inner ring 3 is butted against a step surface 12 formed on the hub 2*b*. The inner ring 3 is fit to the hub 2*b* by interference fitting causing a static friction force, which is larger than a thrust load acting on the inner ring 3 based on the pre-loading. Therefore, the inner end face of the inner ring 3 is clamped with a caulking portion, which is formed by expanding outward in the diameter directions a cylindrical portion 18 formed in the inner end of the hub 2*b*.

4 Claims, 7 Drawing Sheets

WHEEL-SUPPORT ROLLING BEARING UNIT AND METHOD OF MANUFACTURING THE SAME

This is a divisional of application Ser. No. 09/739,665 filed Dec. 20, 2000; now U.S. Pat. No. 6,553,666 the disclosure of which is incorporated herein by reference.

BACKGROUND OF THE INVENTION

The present invention relates to a wheel-support rolling bearing unit, which is used for rotatably supporting vehicle wheels on suspension devices, and also relates to a method of manufacturing the same.

The vehicle wheels are supported on the suspension devices by the wheel-support rolling bearing unit. FIG. 4 shows a conventional wheel-support rolling bearing unit widely used. The conventional wheel-support rolling bearing unit 1 includes a hub 2, an inner ring 3, an outer ring 4, and a plurality of rolling elements 5. A first flange 6 for supporting the wheel is formed at the outer end of the outer peripheral surface of the hub 2 (the word "outer side or outside" means the outer side of the vehicle body as viewed in the widthwise direction in a state that the unit is assembled into the motor vehicle, and the left side in those figures except FIG. 8. The word "inner side or inside" means locations closer to the center of the vehicle body as viewed in the widthwise direction, and the right side in those figures except FIG. 8.). A first inner raceway 7 is formed in the outer surface of a middle portion of the hub 2. A stepped part 8 having the reduced outside diameter is formed at the inner end thereof.

The inner ring 3 having a second inner raceway 9 formed therein is fit to the stepped part 8. A male threaded portion 10 is formed in the inner end of the hub 2. The top end (the right end in FIG. 4) of the male threaded portion 10 is extended inward beyond the inner end face of the inner ring 3. The inner ring 3 is held between the nut 11 screwed to the male threaded portion 10 and a step surface 12 of the stepped part 8, whereby the inner ring 3 is firmly coupled to a predetermined position on the hub 2. An engaging recess 13 is formed in the outer peripheral surface of the top end of the male threaded portion 10. The nut 11 is fastened by a predetermined torque, and then a part of the nut 11, which is aligned with the engaging recess 13, is radially and inwardly caulked, thereby preventing the loosening of the nut 11.

A first outer raceway 14 and a second outer raceway 15 are formed in the inner peripheral surface of the outer ring 4. The first outer raceway 15 is confronted with the first inner raceway 7. The second outer raceway 15 is confronted with a second inner raceway 9. A plurality of rolling elements 5 are located between the first inner raceway 7 and the first outer raceway 14. A plurality of rolling elements 5 are located between the second inner raceway 9 and the second outer raceway 15. In the illustrated instance, the rolling elements 5 are balls; however, in the case of the wheel-support rolling bearing unit for motor vehicles which is heavy, those may be tapered rollers.

To assemble the wheel-support rolling bearing unit 1 into the motor vehicle, the outer ring 4 is fixed to a suspension device with a second flange 16 formed on the outer peripheral surface of the outer ring 4, and the wheel is fixed to the first flange 6. As a result, the wheel is rotatably supported on the suspension device.

In Japanese Patent Unexamined Publication No. Hei.11-129703, there is described a wheel-support rolling bearing unit 1a as shown in FIGS. 5 to 7. The wheel-support rolling bearing unit 1a as a second conventional technique includes a hub 2a, an inner ring 3, an outer ring 4, and a plurality of rolling elements 5. A first flange 6 for supporting the wheel is formed at a portion of the hub 2a which is closer to the outer end of the outer peripheral surface thereof. A first inner raceway 7 is formed in the outer surface of a middle portion of the hub 2a. A stepped part 8 having the reduced outside diameter is formed at the inner end thereof.

A cylindrical portion 18, which is used for forming a caulking portion 17 to fix the inner ring 3, is formed in the inner end of the hub 2a. A thickness of the cylindrical portion 18 becomes small toward its top end (the right end in FIG. 7) before the cylindrical portion 18 shown in FIG. 7 is expanded, for caulking, outward in the diameter directions. Accordingly, a tapered hole 19 is formed in the inner end face of the hub 2a. The inside diameter of the tapered hole becomes small toward a recess.

To expand, for caulking, the top end of the cylindrical portion 18 in order to fasten the inner ring 3 to the inner end of the hub 2a, a force piston 20 is forcibly pressed against the top end of the cylindrical portion 18 in a state that the hub 2a is fixed so as not to shift in the axial direction, as shown in FIG. 6. An outward curved portion 21, shaped like a truncated cone, which may be thrust into the cylindrical portion 18, is formed in the central portion of the end surface (left end surface in FIG. 6) of the force piston 20. An inward curved portion or recess 22 is formed surrounding the outward curved portion 21. A cross section of the recess 22 is configured to have a complex curved surface whose radius of curvature becomes small toward the outside so that a cross section of the caulking portion 17, which is formed by plastically forming the top end of the cylindrical portion 18 by the recess 22, gradually reduces in size from the base end to the top end, and abruptly reduces at the top end.

By pressing the force piston 20 having the outward curved portion 13 and the recess 22, which are shaped and have dimensions as mentioned above, against the top end of the cylindrical portion 18, the top end of the cylindrical portion 18 is forcibly expanded outward in the diameter directions for caulking, to thereby form a caulking portion 17. The inner ring 3 is firmly held between the caulking portion 17 and a step surface 12 of the stepped part 8 formed at the inner end of the hub 2a, whereby the inner ring 3 is fastened to the hub 2a.

For a work to form the caulking portion 17 by plastically deforming (expanding for caulking) the cylindrical portion 18, it is preferable to use a swing press 23 as shown in FIG. 8. The swing press 23 is made up of a force piston 20, a holding tool 24 and a holder 25. In forming the caulking portion 17 by expanding for caulking the cylindrical portion 18, the force piston 20 is displaced in a swing manner while pushing upward the hub 2a with the aid of the holder 25. In a state that the center axes of the force piston 20 and the hub 2a are inclined at an angle θ with respect to each other, the force piston 20 is turned about the center axis of the hub 2a, while being in contact with each other. In forming the caulking portion 17 by the swing press as just-mentioned, a part of the circumference of the force piston 20 is pressed against the cylindrical portion 18, so that the caulking expanding work of the caulking portion 17 continuously progresses in part in the circumferential direction. For this reason, when comparing with the forming of the caulking portion 17 by ordinary forging process, a load acting on the cylindrical portion 18 may be reduced during the forging process. The holding tool 24 prevents the inner ring 3 and the hub 2a from moving in the radial direction during the caulking expanding work of the caulking portion 17 by the force piston 20.

In the conventional wheel-support rolling bearing unit thus constructed, it is difficult to apply a pre-load to the rolling elements 5 and to render normal a fitting state of the inner ring 3 to the hub 2a. In recent years, a measure in which the pre-load is applied to the rolling elements 5 has been employed in order to increase a rigidity of the wheel-support rolling bearing unit. The related component parts are dimensioned so that the pre-loading has an appropriate value in a state that the outer end face 28 of the inner ring 3 is in contact with the step surface 12 formed on the outer peripheral surface of the hub 2a.

In a state that the outer end face 28 of the inner ring 3 is brought into contact with the step surface 12 to pre-loading the rolling elements 5, a thrust load acts on the inner ring 3 based on the pre-loading, in the direction causing the inner ring 3 to move apart from the step surface 12. In the case of the conventional structure, the inner ring 3 is axially displaced by such a thrust load before the caulking portion 17 is formed at the inner end of the hub 2a, and as a result, the outer end face 28 is separated from the step surface 12.

If the work to form the caulking portion 17 starts from a state that the outer end face 28 of the inner ring 3 is separated from the step surface 12, the inner ring 3 is pressed against the step surface 12, while being scraped off. Specifically, with the formation of the caulking portion 17, the inner ring 3 is pushed onto the stepped part 8. At this time, the direction of the force pressing the inner ring 3 is slanted with respect to the directions of the axes of the inner ring 3 and the hub 2a. Accordingly, the circumferential edge of the opening of the outer end of the inner ring 3 is pushed onto the stepped part 8 while forcibly rubbing against the outer peripheral surface of the stepped part 8 (biting into the outer peripheral surface of the stepped part 8).

As a result, a small depression is formed in the outer peripheral surface of the stepped part 8. This possibly leads to degradation of the roundness deviation of the second inner raceway 9, which is formed in the outer peripheral surface of the inner ring 3, and an inclination (small as it is) of the center axis of the inner ring 3 with respect to the center axis of the hub 2a. The degradation of the circularity deviation and the center axis inclination are both undesirable since those will cause the vibration during the operation of the wheel-support rolling bearing unit to increase and the unit performances to deteriorate.

SUMMARY OF THE INVENTION

It is an object of the present invention to provide a wheel-support rolling bearing unit and method of manufacturing the same, which can prevent the outer peripheral surface of the stepped part from being depressed and the center axis of the inner ring from being inclined.

According to one aspect of the invention, there is provided a wheel-support rolling bearing unit comprising: a hub having a first flange formed on the outer peripheral surface of one end thereof, and a first inner raceway formed in the outer peripheral surface of a middle portion thereof with an inner ring integrally or separately formed; a stepped part formed at the other end of the hub, the inside diameter of the stepped part being smaller than of a portion of the hub where the first inner raceway is formed; an inner ring having a second inner raceway formed in the outer peripheral surface thereof, the inner ring being fit to the stepped part; an outer ring having first and second outer raceways formed in the inner peripheral surface, the first outer raceway being confronted with the first inner raceway and the second outer raceway being confronted with the second inner raceway; and a plurality of rolling elements being located between the first inner raceway and the first outer raceway and a plurality of rolling elements being located between the second inner raceway and the second outer raceway; wherein by a caulking portion, which is formed by radially and outwardly expanding for caulking a cylindrical portion formed at a portion of the other end of the hub, which is protruded beyond at least the inner ring fit to the stepped part, the inner ring fit to the stepped part is held down against the step surface of the stepped part, and firmly coupled to the hub.

In the wheel-support rolling bearing unit, a pre-load is applied to the rolling elements. The inner ring is fit to the stepped part by interference fitting (in other words, fittingly inserting with interference). A static friction force which acts on the inner ring by the interference fitting is larger than an axial load acting on the inner ring by the pre-load applied to the rolling elements.

According to another aspect of the invention, there is provided a method for manufacturing the wheel-support rolling bearing unit defined as mentioned above, comprising the steps of: fitting the inner ring to the stepped part of the hub by interference fitting; butting the end face of the inner ring against the step surface of the stepped part of the hub, to thereby applying a pre-load to the rolling elements; forming a caulking portion at the stepped part by radially and outwardly expanding the cylindrical portion formed at the other end of the hub in a state that the inner ring is fixed to the stepped part by the static friction force based on the interference fitting in a state that the end face of the inner ring is butted against and fixed to the step surface of the stepped part of the hub.

The object of the present invention can be achieved by a wheel-support rolling bearing unit comprising an outer ring, an inner ring, a hub, a plurality of first and second rolling elements. The outer ring has first and second outer raceways formed on its inner peripheral surface. The hub has a flange formed on the outer peripheral surface of one end thereof, the hub having a first inner raceway which is disposed on its middle portion in an axial direction thereof and is confronted with the first outer raceway of the outer ring, the hub having a stepped part and a cylindrical portion disposed at the other end of the hub, a step surface being defined on the hub by the stepped part. The inner ring is fit to the stepped part of the hub with interference while the end surface of the inner ring is brought in contact with the step surface of the hub, the inner ring having a second inner raceway which is formed on its outer peripheral surface and is confronted with the second outer raceway of the outer ring. The plurality of first rolling elements are located between the first inner raceway and the first outer raceway; and the plurality of second rolling elements are located between the second inner raceway and the second outer raceway. In the construction, a caulking portion, which is formed by plastically deforming the cylindrical portion, is protruded beyond at least the inner ring thus fit to the hub. In the above-mentioned wheel-support rolling bearing unit, the inside diameter of the stepped part is smaller than that of a portion of the hub where the first inner raceway is formed. Further, in the above-mentioned wheel-support rolling bearing unit, a pre-load is applied to the first and second rolling elements by bringing the end surface of the inner ring in contact with the step surface of the stepped part prior to the caulking, and a static friction force which acts on the inner ring by the interference fitting is larger than an axial load acting on the inner ring by the pre-load applied to the rolling elements.

In the above-mentioned wheel-support rolling bearing unit according to the present invention, it is also advantageous that the hub comprises:

a main body integrally formed with the flange portion; and a separate inner ring which has the first inner raceway and is fit to the main body, the step surface being formed on an end surface of the separate inner ring.

Moreover, the wheel-support rolling bearing unit according to the present invention, it is more preferable that a stress, which is caused in the circumferential direction in the inner ring by the interference fitting, is smaller than the result of subtracting a stress, which acts on the inner ring in the circumferential direction when the caulking portion is formed, from a tolerable stress acting on the inner ring in the circumferential direction.

The above-mentioned object can also be achieved by a wheel-support rolling bearing unit, according to the present invention comprising an outer ring, an inner ring, a hub, a plurality of first and second rolling elements. The outer ring has first and second outer raceways formed on its inner peripheral surface. The hub has a flange formed on the outer peripheral surface of one end thereof, the hub having a first inner raceway which is disposed on its middle portion in an axial direction thereof and is confronted with the first outer raceway of the outer ring, the hub having an end portion disposed at the other end of the hub. The inner ring is fit to the end portion with interference, the inner ring having a second inner raceway which is formed on its outer peripheral surface and is confronted with the second outer raceway of the outer ring. The plurality of first rolling elements are located between the first inner raceway and the first outer raceway, and the plurality of second rolling elements are located between the second inner raceway and the second outer raceway. In the roller bearing unit, a caulking portion, which is formed by plastically deforming a portion of the end portion of the hub, is protruded beyond at least the inner ring thus fit to the hub, and a stress, which is caused in the circumferential direction in the inner ring by the interference fitting, is smaller than the result of subtracting a stress, which acts on the inner ring in the circumferential direction when the caulking portion is formed, from a tolerable stress acting on the inner ring in the circumferential direction.

In the wheel-support rolling bearing unit, it is advantageous that the hub comprises a main body integrally formed with the flange portion; and a separate inner ring which has the first inner raceway and is fit to the main body.

The above-mentioned object can also be attained by a method for manufacturing a wheel-support rolling bearing unit comprising:

an outer ring having first and second outer raceways formed on its inner peripheral surface;

a hub having a flange formed on the outer peripheral surface of one end thereof, the hub having a first inner raceway which is disposed on its middle portion in an axial direction thereof and is confronted with the first outer raceway of the outer ring, the hub having a stepped part and a cylindrical portion disposed at the other end of the hub, a step surface being defined on the hub by the stepped part;

an inner ring provided at the other end of the hub, the inner ring having a second inner raceway which is formed on its outer peripheral surface and is confronted with the second outer raceway of the outer ring;

a plurality of first rolling elements located between the first inner raceway and the first outer raceway; and a plurality of second rolling elements located between the second inner raceway and the second outer raceway;

the method comprising:

fitting the inner ring to the stepped part of the hub by interference fitting while bringing an end surface of the inner ring into contact with the step surface of the hub, to thereby applying a pre-load to the rolling elements;

forming a caulking portion by plastically deforming the cylindrical portion, wherein the caulking portion is protruded beyond at least the inner ring thus fit to the hub.

In the method according to the present invention, it is advantageous that a static friction force which acts on the inner ring by the interference fitting is larger than an axial load acting on the inner ring by the pre-load applied to the rolling elements.

Further, in the method according to the present invention, it is preferable that a stress, which is caused in the circumferential direction in the inner ring by the interference fitting, is smaller than the result of subtracting a stress, which acts on the inner ring in the circumferential direction when the caulking portion is formed, from a tolerable stress acting on the inner ring in the circumferential direction.

According to the wheel-support rolling bearing unit and method of manufacturing the same, the inner ring is not displaced to the hub when the caulking portion is formed. Specifically, the inner ring is fit to the stepped part of the hub prior to the formation of the caulking portion. The end face of the inner ring is left as it is in contact with the stepped part independently of the thrust load based on the pre-load in a state that the respective rolling elements are pre-loaded. Accordingly, even if with progress of the caulking portion forming work, the force slanted in direction with respect to the center axes of the inner ring and the hub act onto the inner ring, it never happens that the circumferential edge of the opening of the outer end of the inner ring forcibly rubs against the outer peripheral surface of the stepped part 8 and that the center axis of the inner ring slants with respect to the center axis of the hub.

DETAILED DESCRIPTION OF THE PREFERRED EMBODIMENTS

Figure 1:
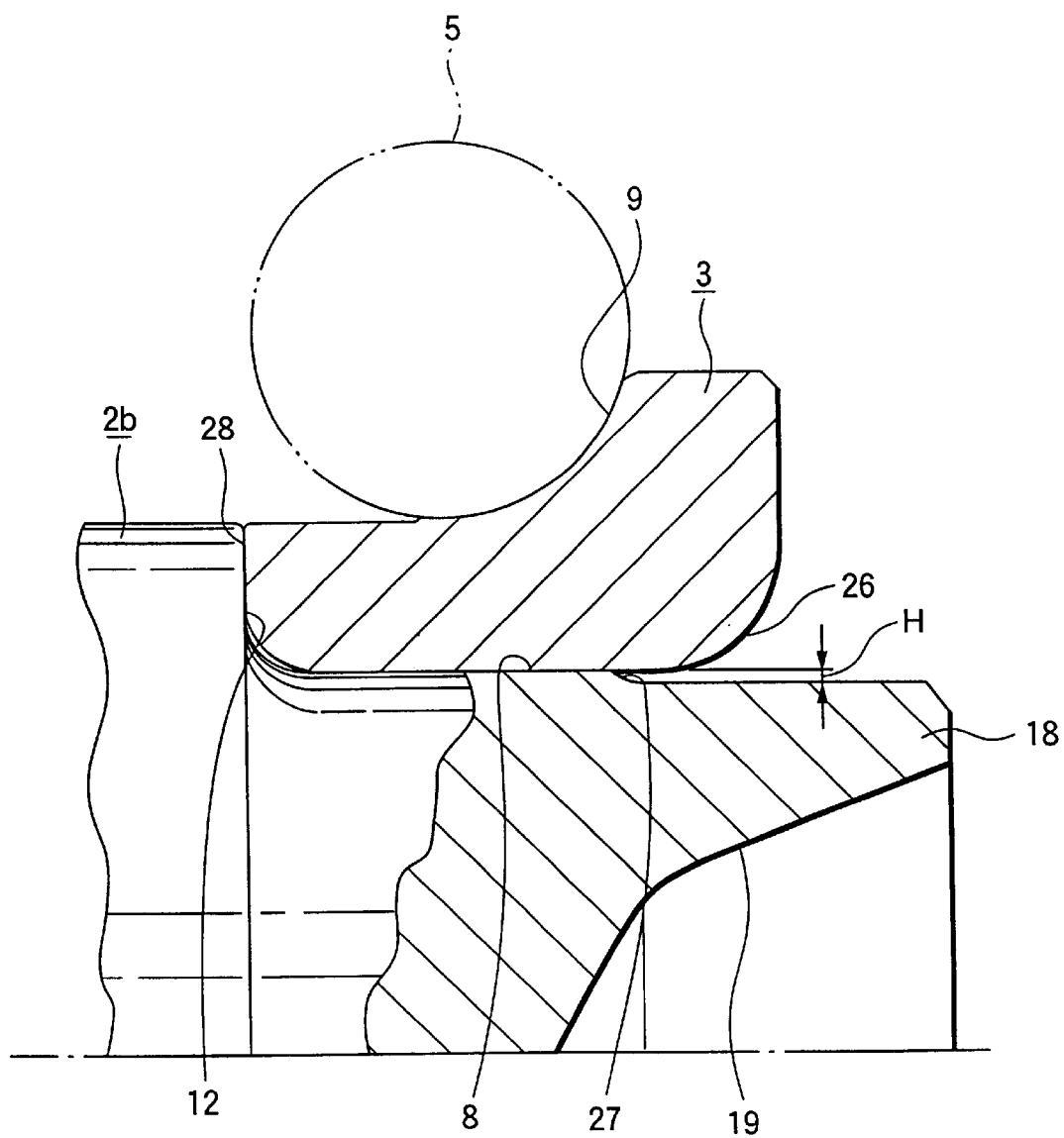
FIG. 1 is a cross sectional view showing a main part of a wheel-support rolling bearing unit, which is a first embodiment and/or a second embodiment of the present invention.
Figure 2:
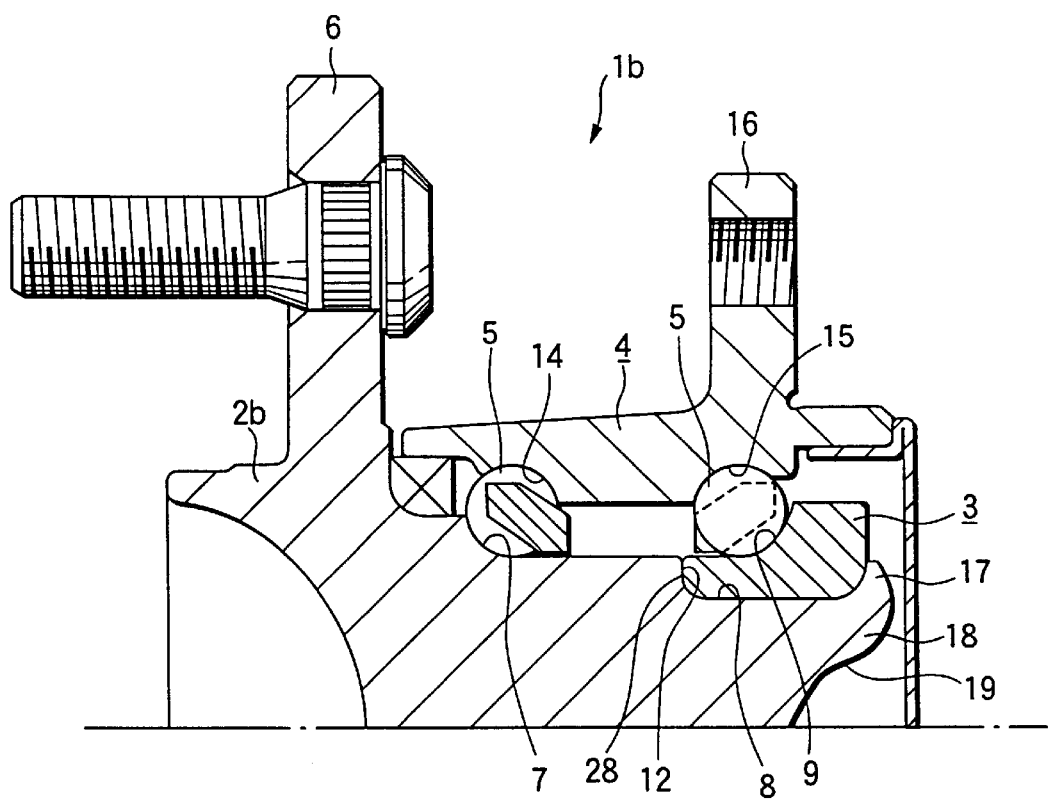
FIG. 2 is a cross sectional view showing a part of the wheel-support rolling bearing unit.

FIGS. 1 and 2 show a first embodiment of the present invention. One of the characteristic features of the invention resides in a structure of a portion in the wheel-support rolling bearing unit in which the inner ring 3 is fit to the stepped part 8 that is formed on the outer peripheral surface of the inner end of the hub 2b, and a method of manufacturing the same. A structure of the whole wheel-support rolling bearing unit and its operation are substantially the same as those described in connection with FIG. 5. Therefore, description to follow will be given placing emphasis on the structure essential to the invention and those portions different from the background art. Like reference numerals are used for indicating like or equivalent portions in FIG. 5, for simplicity.

Figure 3:
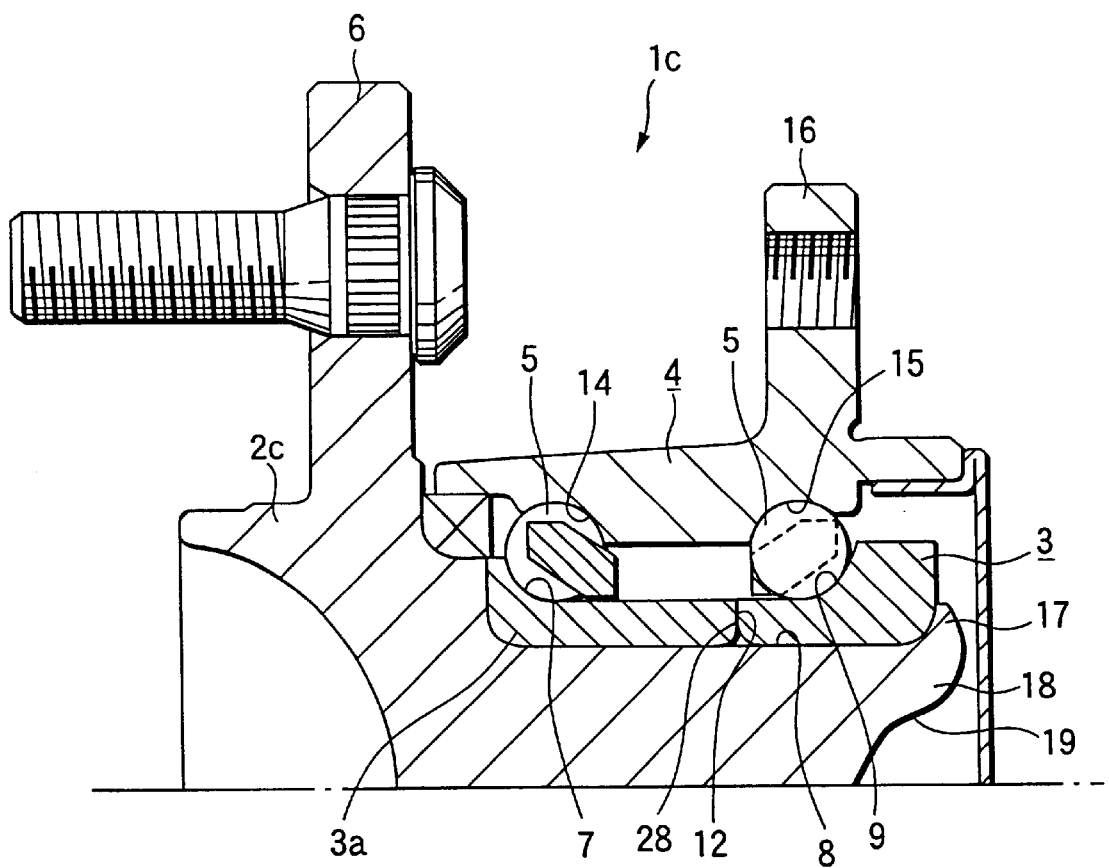
FIG. 3 is a cross sectional view showing a wheel-support rolling bearing unit, which is a modification of the embodiment of the present invention.

There is a modification of the above-mentioned embodiment that, as shown in FIG. 3 the first inner raceway 7 is formed in the outer peripheral surface of a separate inner ring 3a, which is fit to the middle of a hub 2c, while not directly formed in (not integral with) the outer peripheral surface of the middle portion of the hub 2c. In this case, a portion of the hub 2c which is protruded, at the end, inward in the axial direction and beyond the inner ring 3a of this separate inner ring, is used as a stepped part to which the inner ring 3 is fit. In this case, the end face of the separate inner ring 3a serves as the step surface 12 of the stepped part.

The inner ring 3 is fit, by the interference fitting, to the stepped part 8 that is formed on the outer peripheral surface of the inner end of the hub 2b (FIGS. 1 and 2). A desired pre-load is applied to the rolling elements 5 in a state that the outer end face 28 of the inner ring 3 is butted against the step surface 12 of the stepped part 8. A static friction force which acts on the inner ring 3 by the interference fitting is larger than an axial load acting on the inner ring 3 by the pre-load applied to the rolling elements 5. Accordingly, in a state that the desired pre-load is, as described above, applied to the rolling elements 5 by butting the outer end face 28 of the inner ring 3 against the step surface 12, the inner ring 3 is left as it is (the outer end face 28 of the inner ring 3 is left as it is butted against the step surface 12) even before the cylindrical portion 18 formed in the inner end of the hub 2b is not expanded for caulking.

Figure 5:
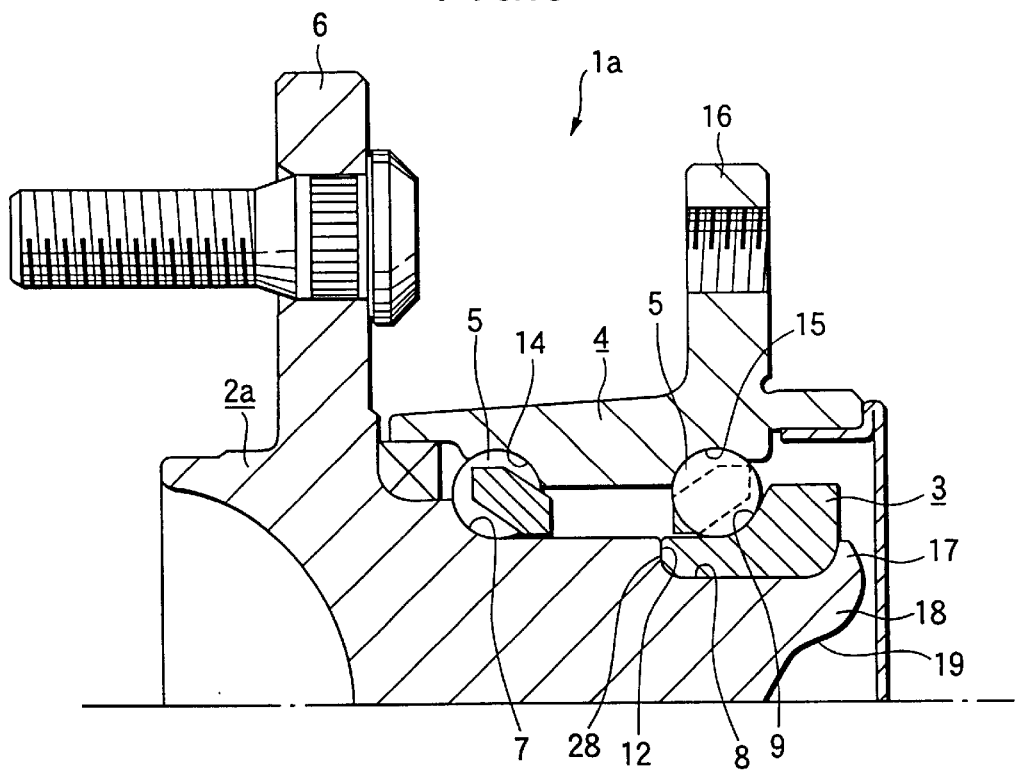
FIG. 5 is a cross sectional view showing a part of another conventional wheel-support rolling bearing unit.
Figure 6:
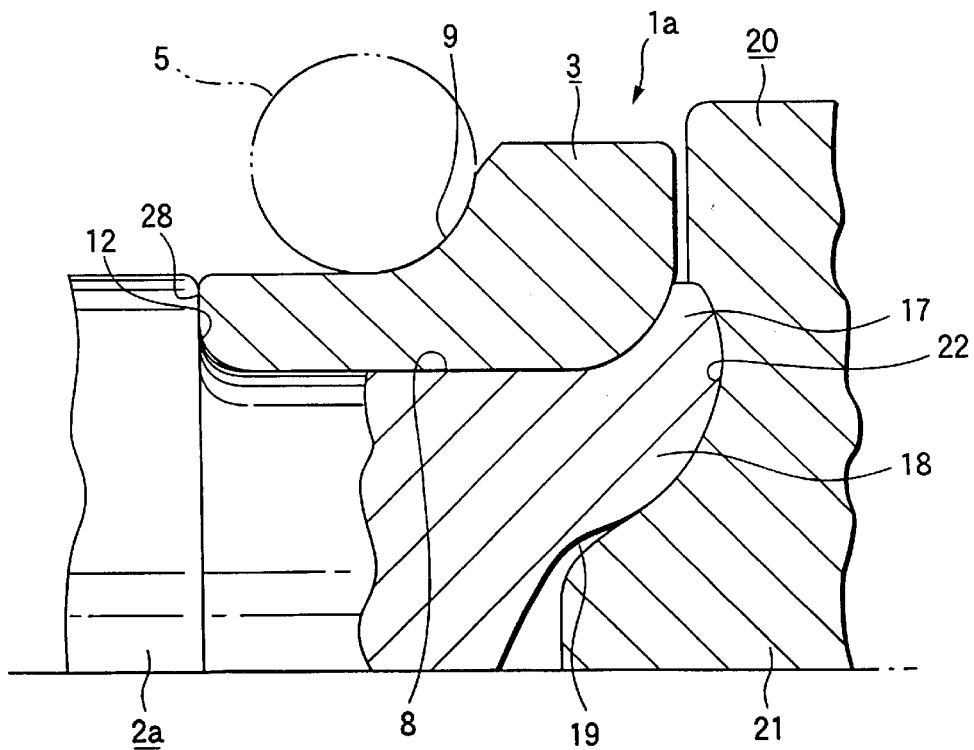
FIG. 6 is an enlarged, cross sectional view showing a state that the inner end of the hub is expanded for caulking in order to fix the inner ring in the second conventional wheel-support rolling bearing unit when it is manufactured.
Figure 7:
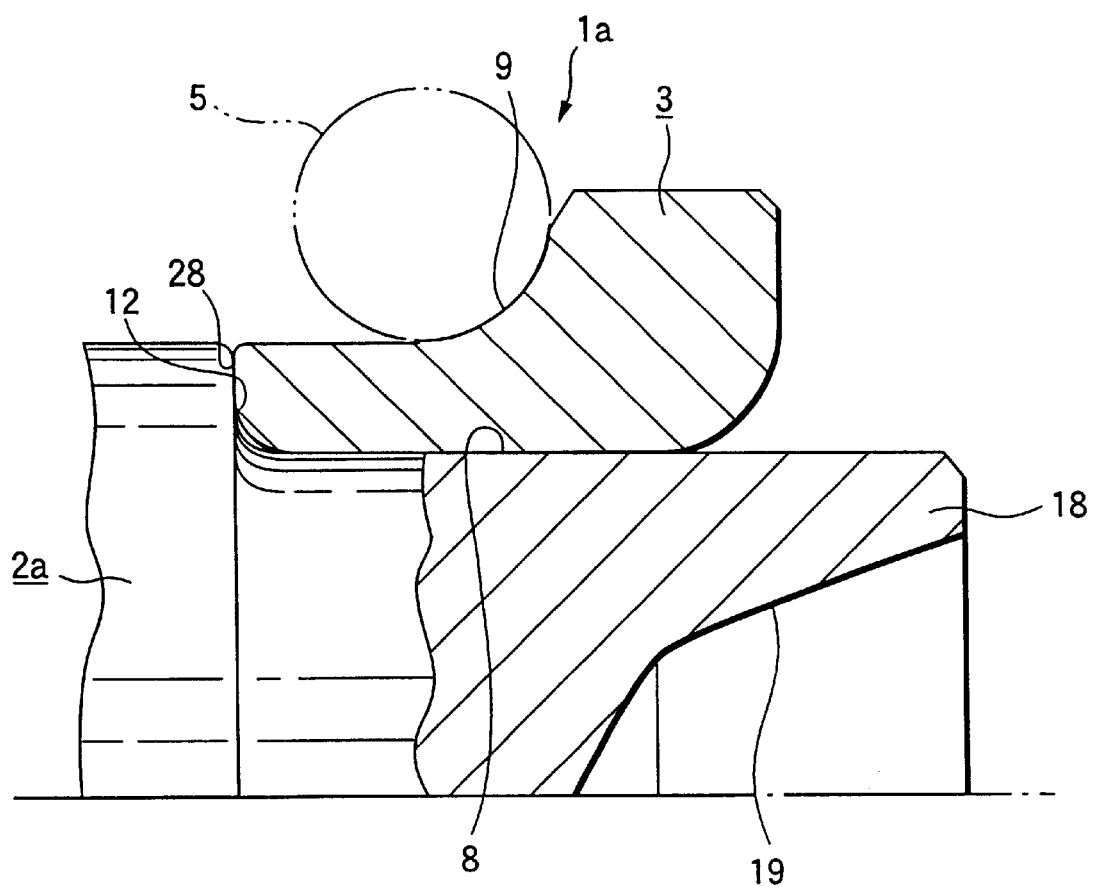
FIG. 7 is an enlarged, cross sectional view showing a part of the second conventional wheel-support rolling bearing unit before the inner end of the hub is expanded for caulking.
Figure 8:
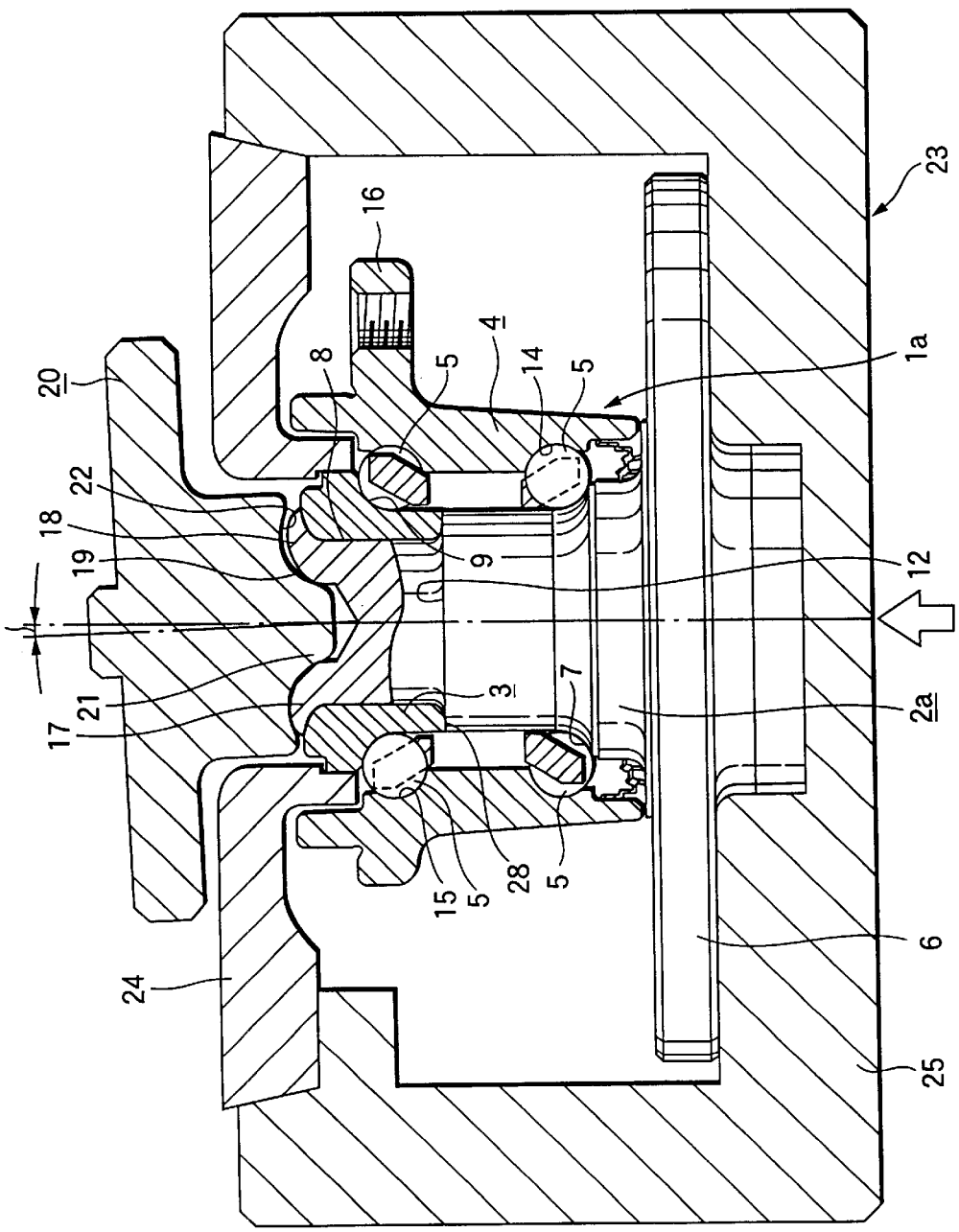
FIG. 8 is a longitudinal sectional view showing a key portion of a swing press.

After the inner ring 3 is fit to the stepped part 8 of the hub 2b by the interference fitting, and the rolling elements 5 are pre-loaded, the cylindrical portion 18 is expanded outward in the diameter directions by the swing caulking as in the conventional case, to thereby form a caulking portion 17 (see FIGS. 5, 6 and 8). In the wheel-support rolling bearing unit and the method of manufacturing the same according to the invention, the inner ring 3 is immovable with respect to the hub 2b when the caulking portion 17 is formed in this way.

The inner ring 3 is fit to the stepped part 8 of the hub 2b before the caulking portion 17 is formed, and in a state that the respective rolling elements 5 are pre-loaded, the outer end face 28 of the inner ring 3 is left as it is in contact with the step surface 12 formed on the outer peripheral surface of the hub 2b, independently of the thrust load based on the pre-load. Accordingly, even if a force slanted in direction with respect to the center axes of the inner ring 3 and the hub 2b acts on the inner ring 3 during the work of forming the caulking portion 17, it never happens that the circumferential edge of the opening of the outer end of the inner ring 3 forcibly rubs against the outer peripheral surface of the stepped part 8 and that the center axis of the inner ring 3 slants with respect to the center axis of the hub 2b.

In the illustrated instance, at the inner end of the hub 2b, the outside diameter of its portion protruded beyond its fitting portion to the inner ring 3 is smaller than the outside diameter of the fitting portion. On the outer peripheral surface of the base end of the cylindrical portion 18 formed in the inner end of the hub 2b, a stepped part 27 having a small height H of 0.02 to 0.12 mm, semi-circular in cross section, is formed at a portion of the hub, which is located somewhat closer to the second inner raceway 9 than a curved surface 26, shaped like a quadrant, which is formed at the opening of the inner end of the inner ring 3. A portion of the cylindrical portion 18, which is reduced in outside diameter, is expanded, for caulking, outward in the diameter directions by the swing caulking, to thereby clamp the curved surface 26 of the inner ring. When the cylindrical portion 18 is thus expanded outward in the diameter directions, a portion to be bent in the expanding caulking work starts its bending from the caulking portion 17. Accordingly, an excessive force is hard to act on the cylindrical portion 18 during the expanding caulking work. As a result, damage, e.g., crack, is hard to be formed in the caulking expanded portion.

Figure 4:
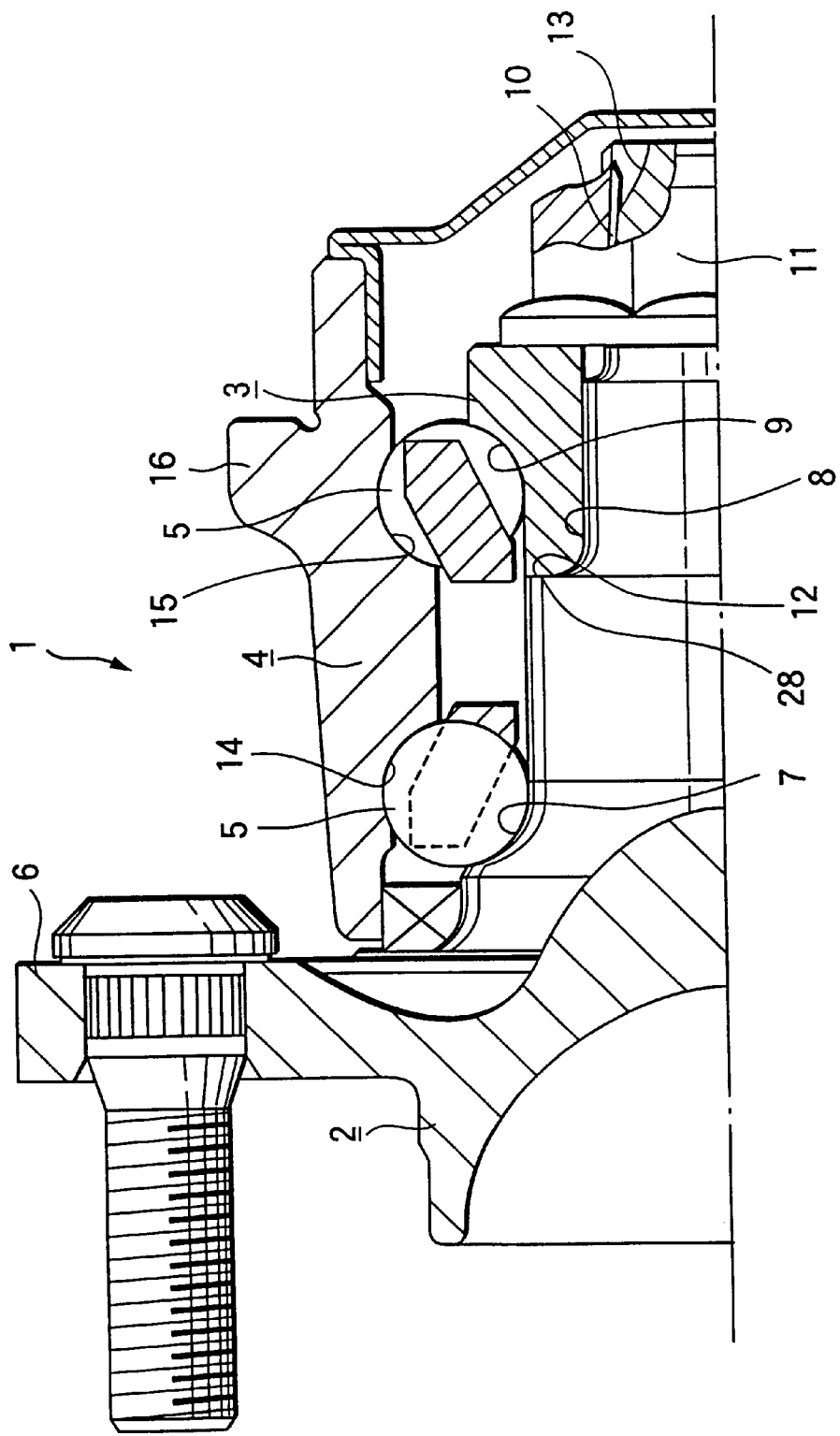
FIG. 4 is a cross sectional view showing a part of a conventional wheel-support rolling bearing unit.

When the technique that a static friction force which acts on the inner ring by the interference fitting is larger than an axial load acting on the inner ring by the pre-load applied to the rolling elements, is applied to the wheel-support rolling bearing unit having such a structure as to fix the inner ring to the hub, excellent operation and effects are secured if the caulking portion is formed at the inner end of the hub by the swing caulking. Also when the technique is applied to the wheel-support rolling bearing unit having such a structure as to fix the inner ring to the hub by means of the nut as shown in FIG. 4, the excellent operation and effects are secured with the caulking portion formed by the ordinary caulking. Specifically, a direction in which a force for pressing a pressing tool, which is for pushing the inner ring onto the hub acts, may be set to be closer to the center axial direction of the hub than a direction of a force acting on the inner ring by the ordinary caulking or the fastening of the nut. Accordingly, a quality wheel-support rolling bearing unit may be produced if the inner ring is fit to the stepped part by the interference fitting and the rolling elements are pre-loaded, and the caulking portion is formed.

In the above-mentioned embodiment of the wheel-support rolling bearing units according to the present invention, as shown in FIG. 2 or 3, the inner ring 3 is fit to the stepped part 8 of the hub 2a by interference fitting (that is, by fittingly inserting with an interference). The reason for this is that it is necessary to make the inner ring 3 immovable relative to the hub 2a before the caulking portion 17 is formed at the inner end of the hub 2a, following the fitting of the inner ring 3 to the stepped part 8. When a pre-load is applied to the rolling elements 5, it is necessary to fit the inner ring 3 to the stepped part 8 by the interference fitting in order to make the inner ring 3 immovable before the caulking portion 17 is formed. Even when a pre-load is applied to the rolling elements 5, it is preferable to fit the inner ring 3 to the stepped part 8 by the interference fitting in order to prevent the inner ring 3 from being shifted in position for some reason or other before the caulking portion 17 is formed.

To prevent the inner ring 3 from shifting in position without fail before the caulking portion 17 is formed, it is desirable that the overlapping width of the inner ring 3 to the stepped part 8 is as large as possible. However, in the case where the overlapping width is excessively large, there is a possibility that the inner ring 3 will be cracked. In an extreme case, there is fear that the wheel-support rolling bearing unit fails to operate. A stress acting on the inner ring 3 in the completed wheel-support rolling bearing unit includes not only a stress by the interference fitting but also the stress resulting from the formation of the caulking portion 17. In the work of forming the caulking portion 17, a force having a radially outward direction acts on the inner ring 3. Accordingly, the resultant force of the force by the interference force and the force by the caulking portion 17 forming work acts as a tensile stress having a circumference direction. To secure the reliability and durability of the wheel-support rolling bearing unit, the necessity is that the inner ring 3 is not cracked under the resultant force of those two forces. In view of the above circumstances, the present invention has been made to provide a novel and unique wheel-support rolling bearing unit.

According to a further aspect of the present invention, there is provided a wheel-support rolling bearing unit comprising: a hub having a first flange formed on the outer peripheral surface of one end thereof, and a first inner raceway track formed in the outer peripheral surface of a middle portion thereof with an inner ring integrally or separately formed; an inner ring having a second inner raceway track formed in the outer peripheral surface thereof; an outer ring having first and second outer raceway tracks formed in the inner peripheral surface, the first outer raceway track being confronted with the first inner raceway track and the second outer raceway track being confronted with the second inner raceway track; and a plurality of rolling elements being located between the first inner raceway track and the first outer raceway track and a plurality of rolling elements being located between the second inner raceway track and the second outer raceway track; wherein by a caulking portion, which is formed by radially and outwardly expanding for caulking a cylindrical portion formed at a portion of the other end of the hub, which is protruded beyond at least the inner ring fit to the hub, the inner ring fit to the hub is firmly coupled to the hub.

In addition to this, in the wheel-support rolling bearing unit, the inner ring is fit to the hub by interference fitting. An overlapping width of the inner ring where the inner ring overlaps with the hub for clamping is selected so that a stress, which is caused in the circumferential direction in the inner ring by the interference fitting, is smaller than the result of subtracting a stress, which acts on the inner ring in the circumferential direction when the caulking portion is formed, from a tolerable stress acting on the inner ring in the circumferential direction.

The wheel-support rolling bearing unit thus constructed, according to the second aspect of the present invention, prevents the inner ring fit to the stepped part from being unintentionally shifted in position before the caulking portion is formed at the end of the hub, and prevents the inner ring from being cracked.

With reference to FIGS. 1 and 2, a second embodiment according to the present invention, as a concrete embodiment of the second aspect, will be hereinafter described. Note that since a construction of the second embodiment is basically the same as the first embodiment except for a structure of a wheel-support rolling bearing unit where the inner ring 3 is firmly coupled to the outer peripheral surface of the inner end of the hub 2b, the same Figures are commonly used.

One of the characteristic features of the second embodiment resides in a structure of a wheel-support rolling bearing unit where the inner ring 3 is firmly coupled to the outer peripheral surface of the inner end of the hub 2b. A structure of the whole wheel-support rolling bearing unit and its operation are substantially the same as those described in connection with the first embodiment. Therefore, description to follow will be given placing emphasis on the structure essential to the invention and those portions different from the first embodiment. The same reference numerals are used for indicating like or equivalent portions, for simplicity.

Further, note that as well as the first embodiment, it is possible to modify the construction of the second embodiment, as shown in FIG. 3.

As shown in FIG. 2, the inner ring 3 is fit, by the interference fitting, to the stepped part 8 that is formed on the outer peripheral surface of the inner end of the hub 2b (FIGS. 1 and 2). In particular, in the wheel-support rolling bearing unit of the invention, a maximum value "dmax" of an overlapping width "d" of the inner ring 3 where the ring overlaps with the stepped part 8 is selected so as to prevent the inner ring from being cracked. When the inner ring 3 is fit to the stepped part 8 (interference fit to) while overlapping each other over the overlapping width "d", a stress $\delta 3$ having a circumferential direction is developed in the inner ring 3. When the cylindrical portion 18 formed in the inner end of the hub 2b is expanded inward in the diameter directions for caulking to form a caulking portion 17, another stress $\delta r$ having a circumferential direction is additionally developed in the inner ring 3. In the invention, the maximum value "dmax" of an overlapping width "d" of the inner ring is selected so as to satisfy $$\delta a > (\delta 3 + \delta r)$$

where
  $\delta a$: tolerable stress of the inner ring 3 having a circumferential direction
  $\delta 3$: stress of the inner ring 3 caused by the interference fitting
  $\delta r$: stress of the inner ring 3 by the work of forming the caulking portion 17

In the instant embodiment, a desired pre-load is applied to the rolling elements 5 in a state that the outer end face of the inner ring 3 is butted against the step surface 12 of the stepped part 8. A static friction force which acts on the inner ring 3 by the interference fitting is larger than an axial load acting on the inner ring 3 by the pre-load applied to the rolling elements 5. Accordingly, in a state that the desired pre-load is, as described above, applied to the rolling elements 5 by butting the outer end face of the inner ring 3 against the step surface 12, the inner ring 3 is left as it is (the outer end face of the inner ring 3 is left as it is butted against the step surface 12) even before the cylindrical portion 18 formed in the inner end of the hub 2b is not expanded for caulking.

After the inner ring 3 is fit to the stepped part 8 of the hub 2b by the interference fitting, and the rolling elements 5 are pre-loaded, the cylindrical portion 18 is expanded outward in the diameter directions by the swing caulking as in the conventional case, to thereby form a caulking portion 17. In the wheel-support rolling bearing unit according to the invention, a stress acting on the inner ring 3 is put within the tolerable stress $\delta a$ even in a state the caulking portion 17 is formed.

In the instant embodiment, when the caulking portion 17 is formed as described above, there is no case where the inner ring 3 is displaced with respect to the hub 2b. The inner ring 3 is fit to the stepped part 8 of the hub 2b before the caulking portion 17 is formed, and in a state that the respective rolling elements 5 are pre-loaded, the outer end face 28 of the inner ring 3 is left as it is in contact with the step surface 12 formed on the outer peripheral surface of the hub 2b, independently of the thrust load based on the pre-load. Accordingly, even if a force slanted in direction with respect to the center axes of the inner ring 3 and the hub 2b acts on the inner ring 3 during the work of forming the caulking portion 17, it never happens that the circumferential edge of the opening of the outer end of the inner ring 3 forcibly rubs against the outer peripheral surface of the stepped part 8 and that the center axis of the inner ring 3 slants with respect to the center axis of the hub 2b.

In the illustrated instance, at the inner end of the hub 2b, the outside diameter of its portion protruded beyond its fitting portion to the inner ring 3 is smaller than the outside diameter of the fitting portion. On the outer peripheral surface of the base end of the cylindrical portion 18 formed in the inner end of the hub 2b, a stepped part 27 having a small height H of 0.02 to 0.12 mm, semi-circular in cross section, is formed at a portion of the hub, which is located somewhat closer to the second inner raceway track 9 than a curved surface 26, shaped like a quadrant, which is formed at the opening of the inner end of the inner ring 3. A portion of the cylindrical portion 18, which is reduced in outside diameter, is expanded, for caulking, outward in the diameter directions by the swing caulking, to thereby clamp the curved surface 26 of the inner ring. When the cylindrical portion 18 is thus expanded outward in the diameter directions, a portion to be bent in the expanding caulking work starts its bending from the caulking portion 17. Accordingly, an excessive force is hard to act on the cylindrical portion 18 during the expanding caulking work. As a result, damage, e.g., crack, is hard to be formed in the caulking expanded portion.

Note that while the first and second embodiments are separately explained, it is possible for the present invention to provide the bearing unit having both of the main features of the first and second embodiments.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

As seen from the foregoing description, in the wheel-support rolling bearing unit and the method of manufacturing the same according to the present invention, are free from the degradation of the roundness deviation of the second inner raceway, which is formed in the outer peripheral surface of the inner ring or the inclination of the center axis of the inner ring. Therefore, the wheel-support rolling bearing unit with good performances can stably be produced.

As seen from the foregoing description, the present invention can produce a wheel-support rolling bearing unit which is small in size and light in weight.

What is claimed is:

1. A wheel-support rolling bearing unit comprising:

an outer ring having first and second outer raceways formed in its inner peripheral surface;

a hub having a flange formed on the outer peripheral surface of one end thereof, said hub having a first inner raceway which is disposed on its middle portion in an axial direction thereof and is confronted with said first outer raceway of said outer ring, said hub having a stepped part and a cylindrical portion disposed at the other end of hub, a step surface being defined on said hub by said stepped part, said cylindrical portion further comprising a second stepped part having an outer diameter smaller than that of said stepped part;

an inner ring fit to said stepped part of said hub with interference while the end surface of said inner ring is brought in contact with said step surface of said hub, said inner ring having a second inner raceway which is formed on its outer peripheral surface and is confronted with said second outer raceway of said outer ring;

a plurality of first rolling elements located between said first inner raceway and said first outer raceway; and a plurality of second rolling elements located between said second inner raceway and said second outer raceway;

wherein a caulking portion, which is formed by plastically deforming said cylindrical portion, is protruded beyond at least said inner ring thus fit to said hub, wherein an outer diameter of said stepped part is smaller than that of a portion of said hub where said first inner raceway is formed, and wherein a pre-load is applied to said first and second rolling elements by bringing said end surface of said inner ring in contact with said step surface of said stepped part prior to the caulking, and wherein a static friction force which acts on said inner ring by the interference fitting is larger than an axial load acting on said inner ring by the pre-load applied to said rolling elements.

2. The wheel-support rolling bearing unit according to claim 1, wherein said hub comprises:

a main body integrally formed with said flange portion; and a separate inner ring which has said first inner raceway and is fit to said main body, said step surface being formed on an end surface of said separate inner ring.

3. The wheel-support rolling bearing unit according to claim 1, wherein a stress, which is caused in the circumferential direction in said inner ring by the interference fitting, is smaller than the result of subtracting a stress, which acts on said inner ring in the circumferential direction when said caulking portion is formed, from a tolerable stress acting on said inner ring in the circumferential direction.

4. The wheel-support rolling bearing unit according to claim 2, wherein a stress, which is caused in the circumferential direction in said inner ring by the interference fitting, is smaller than the result of subtracting a stress, which acts on said inner ring in the circumferential direction when said caulking portion is formed, from a tolerable stress acting on said inner ring in the circumferential direction.

* * * * *